(12) United States Patent
Schneider et al.

(10) Patent No.: US 12,101,412 B2
(45) Date of Patent: Sep. 24, 2024

(54) LIGHTWEIGHT FAULT DETECTION MECHANISM FOR STREAMING OF CRYPTOGRAPHIC DATA OBJECTS

(71) Applicant: NXP USA, Inc., Austin, TX (US)

(72) Inventors: Tobias Schneider, Graz (AT); Melissa Azouaoui, Norderstedt (DE); Christine van Vredendaal, Veldhoven (NL)

(73) Assignee: NXP USA, Inc., Austin, TX (US)

( * ) Notice: Subject to any disclaimer, the term of this patent is extended or adjusted under 35 U.S.C. 154(b) by 214 days.

(21) Appl. No.: 17/943,051

(22) Filed: Sep. 12, 2022

(65) Prior Publication Data

US 2024/0089113 A1  Mar. 14, 2024

(51) Int. Cl.
*H04L 9/32* (2006.01)
*H04L 9/00* (2022.01)
*H04L 9/06* (2006.01)

(52) U.S. Cl.
CPC .......... *H04L 9/3236* (2013.01); *H04L 9/3247* (2013.01); *H04L 2209/30* (2013.01)

(58) Field of Classification Search
CPC ..... H04L 9/3236; H04L 9/3247; H04L 9/004; H04L 9/0643; H04L 9/50; H04L 2209/30; H04L 2209/34
See application file for complete search history.

(56) References Cited

U.S. PATENT DOCUMENTS

| | | | |
|---|---|---|---|
| 7,412,641 B2 | 8/2008 | Shokrollahi | |
| 7,834,784 B1* | 11/2010 | Zhang | H03M 7/30 341/51 |
| 8,204,217 B2 | 6/2012 | Bjorkengren et al. | |

(Continued)

OTHER PUBLICATIONS

Amiet, Dorian et al., "FPGA-based SPHINCS + Implementations: Mind the Glitch", 23rd Euromicro Conference on Digital System Design (DSD), Aug. 26, 2020, pp. 229-237, IEEE, Piscataway, NJ, USA.

(Continued)

*Primary Examiner* — Vu V Tran

(57) ABSTRACT

A plurality of objects that comprise an input to a cryptographic signing function. For each object in the plurality of objects, an output value $y_i$ of a hash function is calculated, where the value i is equal to an index value of the object, a compressed output value $x_i$ of a compression function is calculated, the output value $y_i$ from the computer readable memory, and the compressed output value $x_i$ is stored. For each object in the plurality of objects, an output value $y'_i$ of the hash function is calculated, where the value i is equal to the index value of the object, a compressed output value $x'_i$ of the compression function executed on the output value $y'_i$ is calculated, the output value $x'_i$ is determined to be equal to the output value $x_i$, and the output value $y'_i$ is transmitted in an output data stream.

20 Claims, 6 Drawing Sheets

(56) References Cited

U.S. PATENT DOCUMENTS

| | | | |
|---|---|---|---|
| 9,940,445 B2 | 4/2018 | Moritz et al. | |
| 10,305,865 B2 | 5/2019 | Wood | |
| 11,296,868 B1 * | 4/2022 | Maglalang | ............ H04L 9/3239 |

OTHER PUBLICATIONS

Aumasson et al.: "Sphincs+: Submission to the nist post-quantum project", Semantic Scholar, v3, Oct. 1, 2020, 62 pages.

Castelnovi et al.: "Grafting Trees: a Fault Attack against the Sphincs Framework" International Conference on Post-Quantum Cryptography, Part of the Lecture Notes in Computer Science book series (LNSC, vol. 10786), https://www.iacr.org/archive/pkc2016/96140151/96140151.pdf, Apr. 1, 2018, pp. 165-184.

Genet et al; "Practical Fault Injection Attacks on Sphincs"; retreived from the Internet https://kannwischer.eu/papers/2018_hbs_fa_20181015.pdf on May 12, 2022; 18 pages (2018).

Gonzalez et al.; "Verifying Post-Quantum Signatures in 8kb of RAM", Proceedings of Post-Quantum Cryptography—12th International Workshop, PQCrypto 2021, Daejeon, South Korea, Jul. 20-22, 2021; Lecture Notes in Computer Science, vol. 12841; Springer; 2021; pp. 215-233.

Huesling et al: "ARMed Sphincs computing a 41 KB signature in 16 KB of RAM", www.iacr.org/archive/pkc2016/96140151/96140151.pdf, Oct. 27, 2015, 25 pages.

Merkle "A Certified Digital Signature", Advances in Cryptology—CRYPTO (Gilles Brassard, ed.), vol. 435, Springer, 1989, pp. 218-238, https://link.springer.com/content/pdf/10.1007/0-387-34805-0_21.pdf.

Mozaffari-Kermain et al; "Fault Detection Architectures for Post-Quantum Cryptographic Stateless Hash-Based Secure Signatures Benchmarked on ASIC", https://faculty.eng.fau.edu/azarderakhsh/files/2016/11/ACMTECS2017.pdf, ACM Trans. Embed. Comput. Syst. 16, 2, Article 59 (Nov. 2016), 19 pages.

Niederhagen et al, "Streaming Sphincs+ for embedded devices using the example of TPMs", IACR Cryptol. ePrint Arch., https://eprint.iacr.org/2021/1072.pdf , Aug. 2021, 23 pages.

* cited by examiner

1: for i = 1 to n do
2: $z_i = F(x_i)$
3: stream $z_i$

FIG. 1

1: for $i = 1$ to $n$ do
2: $\quad y_i = F(x_i)$
3: $\quad y'_i = F(x'_i)$
4: $\quad$ if $y_i \neq y'_i$ then
5: $\quad\quad$ return $\perp$
6: return $(y_1, y_2, \ldots, y_n)$

FIG. 2

1: $P_1 \leftarrow$ random permutation over $\{1, \ldots, n\}$
2: for $i \in P_1$ do
3: $\quad y_i = F(x_i)$
4: $\quad z_i = C(y_i)$ $\quad \triangleright$ delete $y_i$
5: $P_2 \leftarrow$ random permutation over $\{1, \ldots, n\}$
6: for $i \in P_2$ do
7: $\quad y'_i = F(x_i)$
8: $\quad z'_i = C(y'_i)$
9: $\quad$ if $z_i = z'_i$ then stream $y'_i$ $\quad \triangleright$ delete $y'_i, z_i, z'_i$
10: $\quad$ else "Fault detected"

```
1:  P₁ ← random permutation of specific form over {1,...,n}
2:  for i ∈ P₁ do
3:      if sk_i ∈ K then
4:          sk_i ← K
5:          K := K \ sk_i
6:      else
7:          sk_i = K(i)
8:          K := K ∪ sk_i
9:      if sk_{i+1} ∈ K then
10:         sk_{i+1} ← K
11:         K := K \ sk_{i+1}
12:     else
13:         sk_{i+1} = K(i)
14:         K := K ∪ sk_{i+1}
15:     y_i = F_sk_{i+1}(sk_i)           ▷ delete sk_i, sk_{i+1}
16:     z_i = C(y_i)                      ▷ delete y_i
17: P₂ ← random permutation of specific form over {1,...,n}
18: for i ∈ P₂ do
19:     if sk_i ∈ K then
20:         sk_i ← K
21:         K := K ∪ sk_i
22:     else
23:         sk_i = K(i)
24:         K := K ∪ sk_i
25:     if sk_{i+1} ∈ K then
26:         sk_{i+1} ← K
27:         K := K \ sk_{i+1}
28:     else
29:         sk_{i+1} = K(i)
30:         K := K ∪ sk_{i+1}
31:     y'_i = F_sk_{i+1}(sk_i)
32:     z'_i = C(y'_i)
33:     if z'_i = z_i then                ▷ delete sk_i, sk_{i+1}
34:         stream y'_i                    ▷ delete y'_i, z'_i
35:     else
36:         "Fault detected"
37: stream P₂
```

FIG. 5

LIGHTWEIGHT FAULT DETECTION MECHANISM FOR STREAMING OF CRYPTOGRAPHIC DATA OBJECTS

TECHNICAL FIELD

The present disclosure is directed in general to a system and method for processing cryptographic data in electronic devices and, specifically, to a system and method for implementing signature streaming cryptographic algorithms in memory-constrained devices.

BACKGROUND

Digital cryptographic signatures play an important role in the world's data communication infrastructure. Such signatures underpin important authentication and transaction validation infrastructures in the form of digital certificates to secure digital transactions occurring on the internet or across other communication networks. Often, such authentication and validation systems are implemented by resource-constrained devices, such as those participating in Internet of Things (IoT) networks or other types of sensors, actuators, and appliances, to transmit and receive data and to validate the authenticity of received instructions and commands.

In order to make digital signatures accessible to such resource-constrained devices, it can be important to minimize the resource requirements and optimize the efficiency of the involved cryptographic signature processing algorithms (e.g., key generation, signing and verification).

Commonly used signature schemes include the Rivest-Shamir-Adleman (RSA) cryptosystem and variants of the Elliptic Curve Digital Signature Algorithm ((EC)DSA) cryptosystem. However, with the likely development of quantum computing systems, the security of RSA and (EC) DSA cryptosystems may be threatened. As a potential remedy to the risks posed by quantum computing, hash-based signature (HBS) cryptosystems (such as the SPHINCS+ system) can increase the complexity of a cryptosystem to ensure reliable security, even if cryptographic attacks are generated by quantum computing systems. The security of these HBS cryptosystems rely on the cryptographic strength of hash functions and the pseudo-random cryptographic function families used in implementing such systems. These are cryptographic primitive functions that are well-studied, understood, and may be relatively invulnerable to attacks by quantum computers.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 depicts an algorithm for streaming the output of a cryptographic function F.

FIG. 2 depicts an algorithm for performing a recomputation-based fault detection scheme, where F is the cryptographic function and n is the number of independent objects to compute.

FIG. 3 depicts an algorithm for executing a cryptographic function on a number of streamed input objects that can provide protection against fault-injection attacks and errors.

FIG. 5 depicts a method for fault detection when calculating signatures for streamed independent objects, using, for example, a SPHINCS+ cryptosystem.

DETAILED DESCRIPTION

Figure 4:
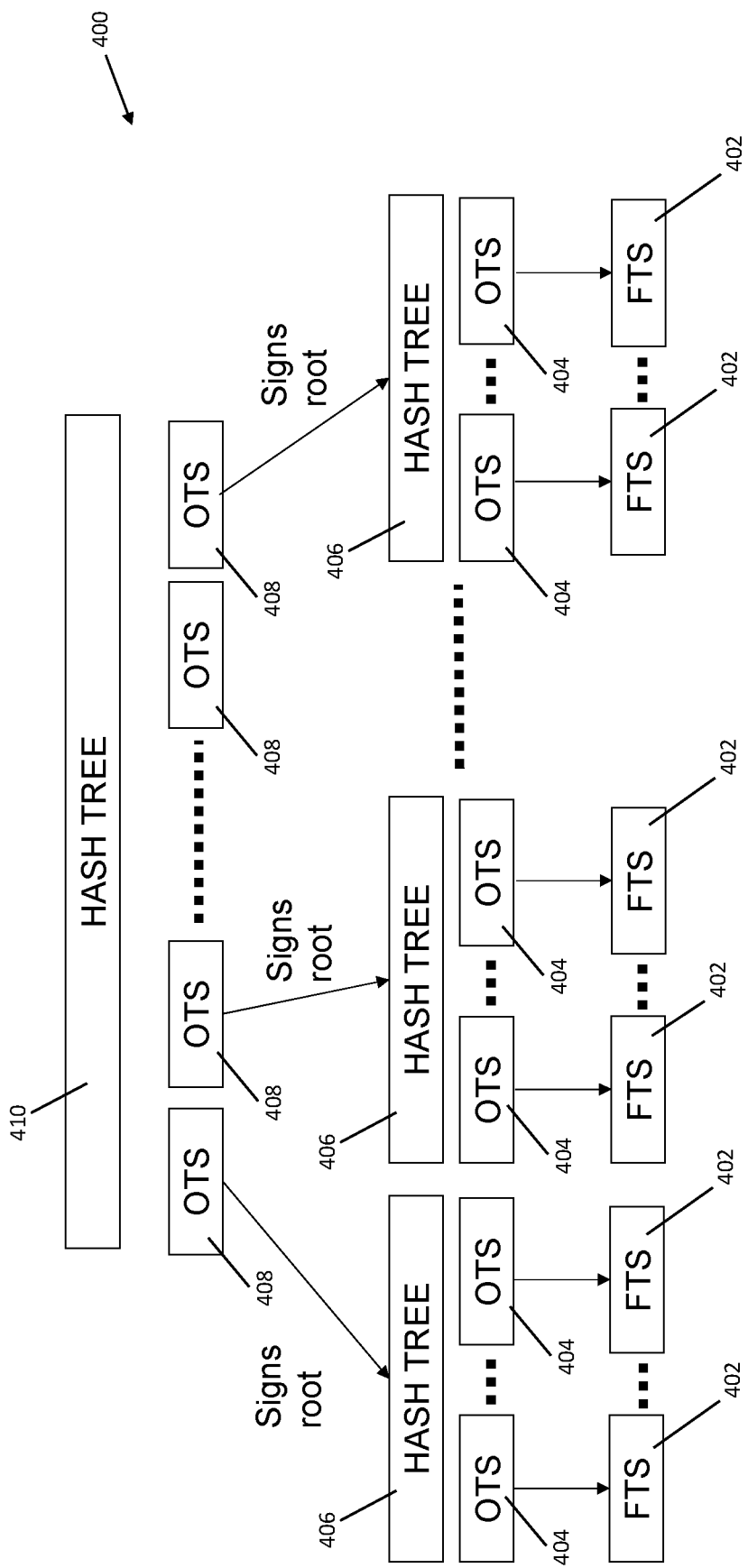
FIG. 4 is a block diagram depicting a hierarchical hash or Merkle tree structure that may be utilized in conjunction with a SPHINCS+ HBS cryptosystem.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

At the core of many hash-based signature (HBS) cryptosystems lies a tree-graph structure or structures in which leaf nodes (i.e., the lowermost layer) of the tree structures correspond to public keys of one-time signature (OTS) key pairs. These public keys are constructed from OTS secret keys using various hash functions. Hash functions are mathematical functions that receive an input of arbitrary length and generate, based on that input, an output that is a pseudorandom ciphertext of a certain length. Hash functions are characterized in that it is very difficult to calculate the input to a hash function based upon an input value.

HBS cryptosystems rely on the processing of data elements that have significantly increased size as compared to other cryptosystems, such as RSA and ECC. Consequently, HBS cryptosystems may high relatively high memory requirements for devices processing secure communications and data signatures using those techniques. To illustrate, EMS schemes such as SPHINCS+ may currently have signature sizes ranging from 8 kilobytes (KB) to 50 KB (as compared to 64 bits (B) for ECDSA at 128-bit security strength). These large signature sizes can present problems when being processed on limited-resource devices such as Internet of Things (IoT) devices, such as smart sensors, home automation devices, and the like. If the device does not have sufficient memory to store the entire signature, then this signature scheme cannot be straightforwardly implemented on such platforms.

A common solution for heavily memory-constrained devices is the streaming of keys, signatures, certificates, or other large data blobs. This involves computing the signature (or other large data elements) in multiple, largely independent, parts, and storing each part elsewhere ("stream") before computing the next part, thereby freeing up the device's local memory. This approach can be used in constrained devices, such as IoT devices, which in the near future are expected to require support for post-quantum (PQ) algorithms.

Due to their physical accessibility, these types of devices can be targeted by physical attacks, and protections against these attacks imply significant overheads both in terms of performance and memory. For example, fault injection attacks are a type of physical attack, in which an attacker inserts or injects a fault (e.g., an erroneous data value) into the device's computation of a cryptographic operation. This fault can cause bit values to change within the device's memory and may be able to manipulate how or whether the device executes certain instructions. Often this type of attack is used by an attacker to access information that would otherwise be protected by the cryptographic algorithms being implemented by the device.

An example countermeasure against these types of fault attacks is to perform the computation of cryptographic signatures (e.g., when signing data or processing a signature to confirm authenticity of data) twice or multiple times and compare the results. If the results are different, that can be indication of a high likelihood of an ongoing fault attack.

Although this countermeasure can be effective, the approach is 1) quite expensive in terms of compute power required to implement the countermeasure, 2) can be impossible to execute on memory-constrained devices when these results are of significant size such that two copies of the computed signature cannot be stored at the same time, and 3) often cannot be combined with various cryptographic streaming techniques.

To mitigate these problems with fault injection countermeasures in conjunction with memory-constrained devices, the present disclosure provides a lightweight fault detection scheme that may be implemented by memory constrained devices implementing streaming cryptographic functions.

Figure 1:
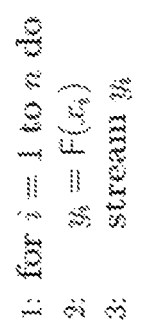

To illustrate, an example cryptographic function F can be applied to an input x to get a result y=F(x). Streaming can be applied to this function when the output of the function can be split into n mostly independent results (called objects in the present disclosure). Streaming the output objects in this manner can be useful for memory-constrained devices that may be unable to simultaneously store the entire set of x and y values, but each of the n independent parts, e.g., x=(x1| . . . |xn), can be individually stored. FIG. 1 depicts an algorithm for streaming the output of a cryptographic function F. As illustrated in FIG. 1, the algorithm includes a loop in which the loop iterates over values of i from 1 to the value of n (i.e., the number of objects in the input to the algorithm). In line 2, the cryptographic function is executed on a series of input objects, each having index i. The output of that cryptographic function, $y_i$, is then streamed as an output of the algorithm in line 3 as a series of output objects $y_i$. In this manner, the input to the cryptographic function is broken down into a series of independent objects that are of a manageable size for the device executing the algorithm. The outputs $y_i$ are streamed in the index order and, as such, the entire output (i.e., $y_{1...n}$) is not required to be stored by the device.

As described above, recomputation (i.e., computing the same cryptographic signature multiple times) may be one countermeasure against fault-injection attacks or errors in a cryptographic system. The countermeasure may involve computing a cryptographic function twice using, if no fault has been injected, the same input values. If the outputs are the same, that indicates the two input values were the same and no fault injection has occurred. Conversely if the two outputs are different, that is highly indicative of a fault injection attack or another type of error.

When implementing this countermeasure in conjunction with a streaming data source, the multiple calculations and comparison of outputs can be performed on each individual object of the received input. If the results of each calculation of each object outputted by the streaming cryptographic function are equal, that indicates no fault injection and that the streaming output of the function is not corrupted.

FIG. 2 depicts an algorithm for performing a recomputation-based fault detection scheme where F is the function and n is the number of independent input objects and the number of independent output objects to be computed. For each object received from the streaming input, the algorithm calls for calculating a first output of the function F as $y_i$ where i is the index of the received object (line 2). The algorithm then calls for recalculating the output function F as applied to the same input object n to generate an independently calculated second output of F as $y'_i$ (line 3). The objects $y_i$ and $y'_i$ are then compared (line 4). If the two values are not equal (indicating a fault) then the algorithm returns an error flag (line 5). If, however, the two objects $y_i$ and $y'_i$ are equal (indicating no fault), the stream of values $y_i$ are returned as an output of the algorithm in each iteration of the depicted loop.

While these recomputation-based fault detection scheme are relatively straightforward to implement, they require the storage of two (or more for improved fault resistance) versions of the value output by the cryptographic function F. For instance, the algorithm depicted in FIG. 2 requires a device executing the algorithm to store both $y_i$ and $y'_i$. While this memory overhead is reasonable when the size of $y_i$ is small and justifiable to achieve resistance against fault attacks, it can be infeasible to execute this countermeasure when the size of all n objects exceeds the device's available memory.

As described above, streaming and recomputation can be utilized to alleviate risks associated with recomputation, however, in some cases, due to the large size of the objects generated by cryptographic functions, it may not be possible (particularly in resource-constrained devices) to even store a single instance of the two values $y_i$ and $y'_i$, and i.e., the two objects required for fault detection.

To mitigate these data storage problems, the present disclosure utilizes a lightweight checksum mechanism, e.g., a cyclic redundancy check (CRC) function or small hash, enabling the two (or more) computed outputs (e.g., $y_i$ and $y'_i$) of the cryptographic function to be compared while only storing a small number of the intermediate objects for later comparison, as described below. This is particularly useful in implementations where a device cannot store two duplicate copies of an object for comparison and fault detection due to memory constraints.

To enhance the fault detection capabilities of the present system and method, and increase protections a shuffling scheme is introduced in which the input objects are not processed in order. This can significantly increase the complexity of a successful fault injection attack. Although shuffling can improve the efficacy of the fault detection approach, some cryptographic protocols (e.g., SPHINCS+) exhibit some order-dependency when executing cryptographic functions on a sequence of input objects. As such, the present disclosure provides an improved shuffling scheme tailored to order-dependent cryptographic functions and that can be adapted to the memory constraints of resource-constrained devices.

To illustrate, FIG. 3 depicts an algorithm for executing a cryptographic function on a number of streamed input objects that can provide protection against fault-injection attacks and errors. The algorithm of FIG. 3 may be executed on a resource constrained device, for example, which can only store a single large object)), at a time on the device. Because the device cannot store two objects (e.g., $y_i$ and $y'_i$) at the same time, the algorithm of FIG. 3 instead calls for storing compressed versions of the objects and performing comparisons of those compressed objects to provide fault-injection detection.

In this embodiment, the objects $y_i$ and $y'_i$ are compressed using the function C which provides a security or cryptographic property such as a hash function or a cyclic redundancy check (CRC), such as CRC-32, which, based on the large input value $y_i$ generates an output that is a unique ciphertext based on the large input value, where the output has a fixed (and relatively short) length. In an example embodiment, the function C may be configured to output a subset of the hash value $y_i$ or $y'_i$ (e.g., a number of the least significant or most significant bytes in the hash values). This property of the function C provides adequate security against fault injection attacks.

By utilizing the compression function, as indicated, the device performing the method of FIG. 3 is required to only store one large object (e.g., $y_i$ or $y'_i$) at a time, along with the significantly smaller values ($z_1, z_2, \ldots, z_n$), which are generated by the compression function C.

Consequently, the memory requirements for executing this method are reduced from 2·|y| (e.g., as required by the method of FIG. 2) to |y|+(n+1)|z| where |y| and |z| are respectively the sizes of the y and z objects with |y|«|z|. To illustrate the benefit of this reduction in memory requirements, if a device were to have 8 KB of working memory (a typical value for a memory-constrained device) it may only have about 4 KB of working memory as some memory will be used by other processes and system components. In that case, if the size of they hashes (|y|) is 2.5 KB (again, a typical value), the device would be unable to store both the $y_i$ and $y'_i$ values in memory at the same time. In this implementation, however, the size of the z values (|z|) may be 4 B, with n=21, in which case a single $y_i$ value and all 21 $z_i$ values will fit into the device's working memory. In other embodiments, of course, different algorithms may generate yi values and xi values that include different numbers of bytes. In general, however, typical implementations of the present system and method may be implemented wherein a number of bytes in each output value $y_i$ is at least 480 bytes and a number of bytes in each compressed output value $x_i$ is less than 64 bytes.

With reference to FIG. 3, the algorithm is executed in two loops. In the first loop (lines 1-4), a random sequence of the input objects to be processed is generated as $P_1$ (line 1). With the random sequence of input objects $P_1$ defined, lines 2, 3, and 4 form a loop that iterates through the sequence of objects in the order specified by $P_1$ to first calculate the value $y_i$ using the cryptographic function (line 3). As mentioned above, the value $y_i$ is large and so a memory-constrained device may be only capable of storing a single value $y_i$ at a time. Accordingly, in the following step (line 4), a compression function C is applied to the value $y_i$ to generate a compressed output $z_i$, which is generally a hash value based upon the input value $y_i$. The output of the compression function C is small and so all $z_i$ values generated by the execution of the first loop (lines 2-4) can be stored by the device. After each $z_i$ value is calculated, the corresponding $y_i$ value can be discarded to free-up memory resources for the next iteration of the loop.

Then, after the first loop is complete, the algorithm calls for execution of a second loop in which the values $y_i$ and $z_i$ are calculated a second time and a comparison is performed to confirm the $z_i$ values from the first loop match those of the second loop to detect fault-injection attacks or errors. Specifically, a second random sequence of the objects to be processed is generated as $P_2$ (line). In various algorithms $P_1$ and $P_2$ may be different and specify different sequences for the processing of objects. With the random sequence of objects $P_2$ defined, lines 6-10 form the second loop that iterates through the sequence of objects in the order specified by $P_2$ to first calculate the value $y'_i$ using the cryptographic function (line 7). As mentioned above, the value $y'_i$ is large and so a memory-constrained device may be only capable of storing a single value $y'_i$ at a time. Accordingly, in the following step (line 8), a compression function C is applied to the value $y'_i$ to generate a compressed hash output $z'_i$. The output of the compression function C is small and so all z' values generated by the execution of the first loop (lines 6-10) can be stored by the device. After each $z'_i$ value is calculated, the value of $z'_i$ is compared to the corresponding $z_i$ value that was calculated and stored during execution of the first loop (line 9). If the $z_i$ and $z'_i$ values match, that indicates the values are valid and the value of $y'_i$ can be output as part of the algorithm's output stream. In various embodiments, this step involves a device processor (e.g., processor(s) 724 of data processing system 720, described below) outputting the value to another components or software application executing on the device. In other embodiments, this step involves the device processor outputting the value via a data transmission occurring via a network interface (e.g., network interface 734 of data processing system 720) to a remote device. At this point, the $y'_i$ value can be discarded to free-up memory resource for the next iteration of the loop.

If, in line 9 the values $z_i$ and $z'_i$ do not match, that indicates a fault has occurred (e.g., either resulting from a fault injection attack or another type of error) and a suitable error message or flag can be output by the algorithm (line 10). Alternately, if the $z_i$ and $z'_i$ values do not match, the algorithm may instead output alternate data, e.g., random or pseudo-random data, zeroes, or other values for the remaining iterations of the second loop and may only output a "fault detected" message or other flag when the second loop has finished executing. This approach could be preferable, for example, where a communication protocol requires a certain length output from the algorithm of FIG. 3 in order to maintain appropriate data processing synchronization.

A successful fault-injection attack requires that the same object (i.e., the object having the same index i) be manipulated multiple times. This attack complexity may be denoted O(attack). Such an attacker may be able to either inject a random or targeted fault in the computation of a particular input or output object. While the former is simple, the latter is more involved depending on the type of required fault, e.g., how many bits should be set to a specific value.

Using the algorithm of FIG. 3, two aspects that increase O(attack) for such fault attacks. First, the compression (e.g., checksum) function C is used to compare the correctness of redundant computations. The checksum is a mapping of the original value (i.e., $y_i$ or $y'_i$) to a smaller value space and, therefore, provides a probabilistic detection capability. The larger the output space of FUNCTION C, the better the detection capability but also the more memory is required to store the intermediate objects $z_i$ and $z'_i$. Therefore, the characteristics of the function C (i.e., the length of its output) can be adapted to the security requirements and memory capabilities of the device executing the method.

Assuming that the probability of randomly evading detection with a random fault is $$\frac{1}{|C|}$$

and that the associated complexity of a successful attack is O(checksum). Because these attacks require that the fault be placed into a specific object during processing, the inclusion of object sequence shuffling (i.e., the random sequences of objects defined by each of $P_1$ and $P_2$) also increases the attack complexity, as it is not possible to reliably target a specific object by predicting when that object is being process. This can be modeled through the complexity O(shuffling), which indicates the effort to randomly fault the desired object.

A typical attack strategy is to inject random faults in one object of each loop. For an attack to succeed, the faults need to be injected into the same target object in both loops (loop 1 being line 2-4 and loop 2 lines 6-8 in the algorithm of FIG. 3) and both faults need to result in an equivalent checksum value. Overall, this would require an attack complexity of O(attack×shuffling×shuffling×checksum). A better attack strategy may be to solely focus on the second loop. In that case, the attacker injects a random fault in the second loop and only is only required to hit the targeted object and to evade the checksum-based detection. This reduces the attack complexity to O(attack×shuffling×checksum), which is lower than before but still very high.

If an attacker is able to inject targeted faults in the computation, this could allow the attacker to inject the same fault in redundant computations, which can break the original recomputation scheme. However, it may be assumed that an attacker (even one that can inject targeted faults) could not create a single targeted fault that completely evades the checksum detection with a single fault. This is probably the case given the required effort to set a larger bit value to specific state, which can be made harder by adapting the function C accordingly.

As such, an attacker may attempt to inject the same fault into the same object in both loops. However, due to the random sequences in which objects are processed in each of the first and second loop, the difficult of that attack is increased, resulting in a complexity of O(attack×shuffling×shuffling).

As such, the combination of recomputation and the random order in which objects are processed in the algorithm of FIG. 3 can significantly increase the difficulty of even targeted fault attacks.

In the SPHINCS+HBS cryptosystem, a message is signed using a few-time-signature scheme (HORST), whose public key is then signed by a one-time-signature of a first multi-signature-hash-tree. The public key of the first multi-signature-hash-tree is then signed by a one-time-signature of a second multi-signature-hash-tree. The public key of the second multi-signature-hash-tree is then signed by a one-time-signature of a third multi-signature-hash-tree, and so on. This approach leads to a large tree of has trees forming the basis for the cryptosystem, where a message hash along with some randomness dictates which tree on each layer and which OTS-leaf signs the message.

FIG. 4 is a block diagram depicting a hierarchical hash or Merkle tree structure 400 that is a multi-signature hash tree that may be utilized in conjunction with a SPHINCS+HBS cryptosystem. Structure 400 includes a hierarchy of Merkle or hash trees 406 and 410. Each tree 406, 410 contains a number of nodes. The lowest nodes (i.e., the loaf nodes) of each tree 406, 410 correspond to public keys of one-time signature (OTS) key pairs 404 and 408. Public keys are constructed from OTS secret keys using various hash functions. The OTS keypair of the trees 406 at the lowest level within Merkle tree structure 400 are each associated with a set of few time signatures (FTSs) 402. Within Merkle tree structure 400 the root nodes of the tree 406 in the lowest layer of Merkle tree structure 400 are used to sign the individual OTS key pairs 408 of the next highest tree 410. Tree 410, in turn, has a root node whose value is the public key of the entire Merkle tree structure 400.

When signing a message using Merkle tree structure 400 one of the FTSs 402 is determined and used to sign a particular message. To authenticate that signature, the public key of Merkle tree structure 400 must be calculated, which requires calculation of each node between the leaf node associated with the selected FTS and the root node of Merkle tree structure 400.

In using the tree structure 400 of FIG. 4 to compute a signature value (e.g., using the method of FIG. 5), a complete signature consists of n single signature values $y_{1 \leq i \leq n}$, which can be streamed as an output of a signature algorithm one by one. To compute a signature $y_i$, a secret key at level $sk_i$ within Merkle tree structure 400 is used to derive a root value which is then signed by the secret key of the level above $sk_{i+1}$. This procedure is denoted as $y_i = F_{sk_{i+1}}(sk_i)$. The secret keys $sk_i$ are derived through a function K from the index i. Computation of the function K requires a non-negligible computation effort.

Given the function $y_i = F_{sk_{i+1}}(sk_i)$, it is apparent that each secret key is used at least twice at two different levels of the multi-tree. Additionally, computation of a signature $y_i$ using a particular secret key will use the same secret key in the computation of the root value of the signature $y_{i+1}$.

To reduce the computational overhead of computing the same secret key multiple times, the present method requires the executing device to temporarily store computed secret key values in a structure $\mathcal{K}$ and only delete those values after they have been used twice in the signature creation algorithm. As such, when computing a signature $y_i$, where signature $y_{i+1}$ has not yet been computed, the algorithm can store skin a memory structure $\mathcal{K}$ when the value is computed and save, on average, $\mathcal{O}$(skseedderivation) operations. Or, alternatively, the algorithm may, after streaming out the signature, complete the chains of $y_i$ and complete the Merkle tree and store the result (the root corresponding to $sk_i$) in $\mathcal{K}$. This approach would result in a savings, on average, of $\mathcal{O}$(signature) hashes in the computation time of $y_{i+1}$ (specifically those to re-compute $y_i$) at the expense of storing the root (usually 16 bytes). In this case, when computing the root to be signed by $y_i$, i.e., the root corresponding to $sk_{i-1}$ and signature has not yet been computed. In this case the method may store $sk_{i-1}$ in $\mathcal{K}$. This means saving on average $\mathcal{O}$(skseedderivation) hashes in the computation time of $y_{i-1}$ at the expense of storing the derived seed $sk_{i-1}$ (usually 16 bytes). This approach could save even more computation time, if the actual WOTS+ keys derived from $sk_{i-1}$ or $y_{i-1}$ were stored instead. However, this requires the storing (almost) a full signature.

FIG. 5 depicts a method for fault detection when calculating signatures for streamed independent objects, using, for example, a SPHINCS+ crypto system. Method 500 may be implemented by a controller or processor of any suitably configured device. For example, method 500 may be executed by data processing system 720 of FIG. 6. Reference will be made to various functional components of data processing system 720, which are described in more detail below. As such, method 500 may be executed on a resource constrained device, for example, which can only store a single large object)), at a time on the device. Because the device cannot store two objects (e.g., $y_i$ and $y'_i$) at the same time, the algorithm of FIG. 5 instead calls for storing compressed versions of the objects and performing comparisons of those compressed objects to provide fault-injection detection.

In this embodiment, the objects are compressed using the function C which provides a security or cryptographic property such as a hash function or a cyclic redundancy check (CRC), which, based on the large input value $y_i$, generates an output that is a unique ciphertext based on the large input value, where the output has a fixed (and relatively short) length. This property of the function C provides adequate security against fault injection attacks. By utilizing the compression function, as indicated, the device performing method 500 is required to only store one large object (e.g., $y_i$ or $y'_i$) at a time, along with the significantly smaller values $(z_1, z_2, \ldots, z_n)$, which are generated by the compression function C, along with some secret key values.

With reference to FIG. 5, the algorithm is executed in two loops. In the first loop (lines 1-16), a random sequence of the input objects to be processed is generated as $P_1$ (line 1) (e.g., by processor(s) 724 of data processing system 720). With the random sequence of input objects $P_1$ defined, lines 2-16 form a loop that iterates through the sequence of objects as ordered by $P_1$ to first calculate the signature values.

As described above, when generating signature values in accordance with the SPHINCS+ protocol, two secret keys are required, $sk_i$ and $sk_{i+1}$. Accordingly, in line 3, the processor(s) 724 of data processing system 720 accesses a memory system (e.g., memory 726) to determine whether the first required key $sk_i$ is stored within a memory structure $\mathcal{K}$ within memory 726. If so, then the value of the key $sk_i$ is retrieved from the memory structure $\mathcal{K}$ for use. Of note, if the key $sk_i$ was stored within the memory structure memory structure $\mathcal{K}$, that indicates that the key $sk_i$ has already been calculated and used in a prior iteration of the first loop. Because, as described above, keys are utilized a maximum of two times in executing this protocol, it can be determined that after this iteration of the loop of lines 2-16, the key won't be used again. Accordingly, after retrieving the key $sk_i$ from memory structure $\mathcal{K}$, the key $sk_i$ can be removed from memory structure $\mathcal{K}$ in line 5 to free up storage space in memory 726.

If, however, in line 3 it is determined that the key $sk_i$ was not in memory structure $\mathcal{K}$, in line 7, the function K is executed to determine the value of the key $sk_i$, which can then be stored into memory structure $\mathcal{K}$ in line 8.

Accordingly, at this point in method 500, the value of key $sk_i$ has been determined. In lines 9-14 of method 500 a similar process is used to determine the value of key $sk_{i+1}$.

Specifically, in line 9, the processor(s) 724 of data processing system 720 accesses a memory system (e.g., memory 726) to determine whether the key $sk_{i+1}$ is stored within the memory structure $\mathcal{K}$. If so, then the value of the key $sk_{i+1}$ is retrieved from the memory structure $\mathcal{K}$ for use in line 10. Again, if the key $sk_{i+1}$ was stored within the memory structure memory structure $\mathcal{K}$, that indicates that the key $sk_{i+1}$ has already been calculated and previously used in executing the first loop. Because, as described above, keys are utilized a maximum of two times in executing this protocol, it can be determined that after this iteration of the loop of lines 2-16, the key won't be used again. Accordingly, after retrieving the key $sk_{i+1}$ from memory structure $\mathcal{K}$, the key $sk_{i+1}$ can be removed from memory structure $\mathcal{K}$ in line 5.

If, however, in line 9 it is determined that the key $sk_{i+1}$ was not in memory structure $\mathcal{K}$, in line 13, the function K is executed to determine the value of the key $sk_i+1$, which can then be stored into memory structure $\mathcal{K}$ in line 14.

With the keys $sk_i$ and $sk_{i+1}$ determined, in line 15 the value $y_i$ is calculated using the cryptographic function F using the keys $sk_i$ and $sk_{i+1}$ (line 15). As mentioned above, the value $y_i$ is large and so a memory-constrained device may be only capable of storing a single value $y_i$ at a time. Accordingly, in the following step (line 16), a compression function C is applied to the value $y_i$ to generate a compressed output $z_i$. The output of the compression function C is small and so all $z_i$ values generate by the execution of the first loop can be stored by the device. After each $y_i$ value is calculated, the keys $sk_i$ and $sk_{i+1}$ can be deleted from memory 726 to free-up storage space. Similarly, after each $z_i$ value is calculated, the corresponding $y_i$ value can be discarded to free-up memory resources for the next iteration of the loop.

After the first loop of method 500 is complete, processor(s) 724 executes a second loop in which the values $y_i$ and $z_i$ are calculated a second time (i.e., as values y' and z') and a comparison is performed to determine whether the $z_i$ values from the first loop match the z' values of the second loop to detect fault-injection attacks or errors.

Specifically, in the second loop a second random sequence of the objects to be processed is generated by processor(s) 724 as $P_2$ (line 17). In various algorithms $P_1$ and $P_2$ may be different and specify different sequences for the processing of objects. Similarly, as described above, the sequences defined by $P_1$ and $P_2$ may not be entirely random and may instead include shuffled subsets of the index values 1 . . . n.

With the random sequence of objects $P_2$ defined, lines 18-36 of method 500 form the second loop that iterates through the sequence of objects in an order determined by $P_2$.

As described above, when generating signature values in accordance with the SPHINCS+ protocol, two secret keys are required, $sk_i$ and $sk_{i+1}$. Accordingly, in line 19, the processor(s) 724 of data processing system 720 accesses a memory system (e.g., memory 726) to determine whether the first required key $sk_i$ is stored within the memory structure $\mathcal{K}$ stored within memory 726. If so, then the value of the key $sk_i$ is retrieved from the memory structure $\mathcal{K}$ for use in line 20. Of note, if the key $sk_i$ was stored within the memory structure $\mathcal{K}$, that indicates that the key $sk_i$ has already been calculated and previously used. Because, as described above, keys are utilized a maximum of two times in executing this protocol, it can be determined that after this iteration of the loop of lines 2-16, the key won't be used again. Accordingly, after retrieving the key $sk_i$ from memory structure $\mathcal{K}$, the key $sk_i$ can be removed from memory structure $\mathcal{K}$ in line 21.

If, however, in line 19 it is determined that the key $sk_i$ was not in memory structure $\mathcal{K}$, in line 23 the function K is executed to determine the value of the key $sk_i$, which can then be stored into memory structure $\mathcal{K}$ in line 24.

Accordingly, at this point in the second loop method 500, the value of key $sk_i$ has been determined. In lines 25-30 a similar process is then used to determine the value of key $sk_{i+1}$.

Specifically, in line 25, the device accesses a memory system (e.g., memory 726) to determine whether the key $sk_{i+1}$ is stored within the memory structure $\mathcal{K}$. If so, then the value of the key $sk_{i+1}$ is retrieved from the memory structure $\mathcal{K}$ for use in line 26. Of note, if the key $sk_{i+1}$ was stored within the memory structure memory structure $\mathcal{K}$, that indicates that the key $sk_{i+1}$ has already been calculated and previously used. Because, as described above, keys are utilized a maximum of two times in executing this protocol, it can be determined that after this iteration of the loop of lines 19-36, the key won't be used again. Accordingly, after retrieving the key $sk_{i+1}$ from memory structure $\mathcal{K}$, the key $sk_{i+1}$ can be removed from memory structure $\mathcal{K}$ in line 27.

If, however, in line 25 it is determined that the key $sk_{i+1}$ was not in memory structure $\mathcal{K}$, in line 29, the function K is executed to determine the value of the key $sk_i+1$, which can then be stored into memory structure $\mathcal{K}$ in line 30.

With the keys $sk_i$ and $sk_{i+1}$ determined, in line 31 the value $y'_i$ is calculated using the cryptographic function F using the keys $sk_i$ and $sk_{i+1}$ (line 31). As mentioned above, the value $y'_i$ is large and so a memory-constrained device may be only capable of storing a single value $y'_i$ at a time. Accordingly, in the following step (line 32), a compression function C is applied to the value $y'_i$ to generate a compressed output $z'_i$. The output of the compression function C is small and so all $z'$ values generated by the execution of the second loop can be stored by the device. After each $y'_i$ value is calculated, the keys $sk_i$ and $sk_{i+1}$ can be deleted from memory to free-up memory.

After each value is calculated, the $z'_i$ value is compared to the corresponding $z_i$ value that was calculated and stored during execution of the first loop. If the $z_i$ and $z'_i$ values match (line 33), that indicates the values are valid and the value of $y'_i$ can be output as part of the algorithm's output stream in line 34. Once streamed, the value $y'_i$ value can be discarded to free-up memory resource for the next iteration of the loop. In various embodiments, this step involves a device processor (e.g., processor(s) 724 of data processing system 720, described below) outputting the value to another components or software application executing on the device. In other embodiments, this step involved the device processor outputting the value via a data transmission occurring via a network interface (e.g., network interface 734 of data processing system 720).

If, in line 33 the values $z_i$ and $z'_i$ do not match, that indicates a fault has occurred (e.g., either resulting from a fault injection attack or another type of error) and a suitable error message or flag can be output by the algorithm (line 36). Alternately, if the $z_i$ and $z'_i$ values do not match, the algorithm may instead output alternate data, e.g., random or pseudo-random data, zeroes, or other values for the remaining iterations of the second loop and may only output a "fault detected" message or other flag when the second loop has finished executing. This approach could be preferable, for example, where a communication protocol requires a certain length output from the algorithm of FIG. 5 in order to maintain appropriate data processing synchronization.

To reconstruct a SPHINCS+ signature for verification, the objects need to be reordered into their original order. Accordingly, in a final step indicated by line 37, method 500 may output the values $P_2$ to enable the recipient to use the index i sequence specified in $P_2$ to recombine the streamed $y'_i$ values in correct order. As this happens after the computation and comparison of values $z_i$ and $z'_i$, this information cannot be used by a fault attacker to inject new faults. Even so, approaches could be utilized to provide security to the object sequence specified by the value $P_2$. For example, the verifier and signer devices could share a common seed which is used to generate $P_2$. To save resources, it is also possible to not stream the complete permutation $P_2$, but rather the seed that was used to derive $P_2$.

Although method 500 can reduce the computational overhead of the described signature generation and validation process, the method can require storage of, potentially, n/2 secret keys, which may not be feasible on a resource constrained device. To reduce the data storage requirements, instead of shuffling the entire set of indices so that the objects are processed in random order, a number of sequential subsets of indices may first be defined. Then, the subsets can be shuffled so that only the subsets of object will be processed in order. This can reduce the number of secret keys that may need to be stored during execution to a much smaller number than n/2, and will be determined by the subset size. Specifically, instead of having to store $$\left\lceil \frac{n}{2} \right\rceil$$

secret keys, the method only requires storing, at a maximum, $$\left\lceil \frac{l}{2} \right\rceil$$

secret keys the subsets are of size $$l \left( \text{or } \left\lceil \frac{l}{2} \right\rceil + \left\lceil \frac{n}{2l} \right\rceil \right)$$

if the subsets themselves are also shuffled).

When executing method 500, throughout the first computational loop (i.e., lines 2-16), all values $z_i$ are stored by the device into memory, leading to a required storage of $(n+1) \cdot |z|$. Optionally, in the case where the subset shuffling is applied, this can be reduced by interleaving the computations. After a subset of size $l$ is shuffled and computed, it is first computed a second time, allowing for deletion of the stored values of $z_i$. This can then be repeated for every subset, leading to a required memory reservation of $(l+1) \cdot |z|$.

In a specific example execution of the present method, a SPHINCS+ cryptosystem may be utilized with parameterset 128f with m=16-byte hash outputs and 21 WOTS+layers. The compression or checksum function C may be implemented as a CRC function with a 32-bit output. The algorithm may be implemented using two-fold recomputation as in the algorithm of FIG. 3 with shuffle subsets of size 7.

In such an implemented, the scenario results in a worst-case of 760 bytes of storage. This is made up of 4 m=64 bytes to maximally store 4 public keys, 608 bytes for the XMSS signature, and 88 bytes to store the 22 checksum values (or 32 bytes if interleaving is used). Such storage requirements are quite manageable, even in memory constrained devices.

As such, the present method is significant more memory efficient than conventional recomputation algorithms that can require storing at least 1 SPHINCS+ signature, leading to required memory storage of 17088+608=17696 bytes (a 23-fold increases in data storage requirements over that of the present method).

Not only are the storage requirement significantly reduced in the present method, but the algorithm of FIG. 5 provides significant robustness against a fault injection attack. If an attacker were to attempt a fault-injection attack, the attack would result in the following complexities. For ae grafting tree attack it can be assumed that the attack requires 20 faults to be successfully injected to the same object during signature processing. To overcome the checksum by chance, we have checksum=$2^{31}$. To hit the correct shuffled signature, we have $$\text{shuffling} = \frac{l}{2} = 3.5.$$

This results in the total attack complexities for various attack strategies:

Random Faults:

$$20 \times \frac{l}{2} \times 2^{31} \approx 2^{37} \text{ signatures}$$

Targeted Faults (2 per signature):

$$20 \times \frac{l}{2} \times \frac{l}{2} = 245 \text{ signatures}$$

This demonstrates that the present countermeasures are able to provide sufficient protection against both type of attack strategies. Note that although 245 faulted signatures is comparatively small, injecting the same targeted faults in each loop of the algorithm of FIG. 5 is much harder than a random fault, and therefore still a solid countermeasure.

Figure 6:
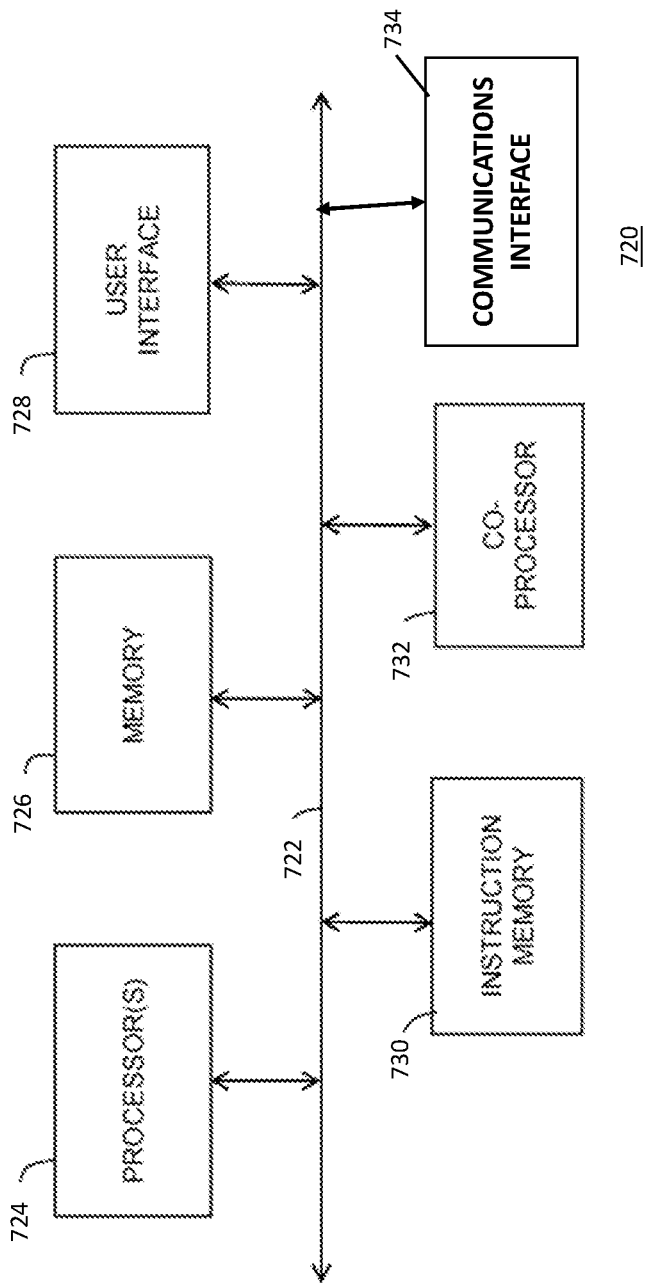
FIG. 6 is a block diagram depicting functional components of a data processing system including a co-processor for fault detection when calculating signatures for streamed independent objects, using, for example, a SPHINCS+ cryptosystem.

FIG. 6 is a block diagram depicting functional components of data processing system 720 including a co-processor 732 for fault detection when calculating signatures for streamed independent objects, using, for example, a SPHINCS+ crypto system. In various embodiments data processing system 720 may include a low resource computing system, such as an IoT device or other device having constrained memory and processing power. An example data processing system 720, for example, may have 8 KB of working memory, some of which will be occupied by data stored by other processes running on data processing system 720. Consequently, such a device attempting to calculate and stream signature hash values may have about 4 KB of memory to perform that activity and may make it impossible for the device to perform.

Data processing system 720 may be a system-on-a-chip (SoC) implemented on a single integrated circuit, or it may be a combination of chips. In other embodiments, data processing system 720 may be implemented within an integrated circuit that may include another type of circuit such as an ASIC (application specific integrated circuit), FPGA (field programmable gate array), or the like, that can provide execute instructions. In one embodiment, data processing system 720 may include metal-oxide semiconductor (MOS) transistors fabricated using a conventional complementary metal-oxide semiconductor (CMOS) process. In another embodiment, data processing system 720 may include other transistor types, such as bipolar, and may be manufactured with a different process.

Data processing system 720 includes communication bus 722, processor(s) 724, memory 726, and cryptography co-processor 732. Bus 722 may be a conventional bus having a plurality of conductors for communicating address, data, and control information. In other embodiments, bus 722 may be an interconnect structure such as for example, a cross-bar switch or other form of interconnect system. Processor(s) 724 is bi-directionally connected to bus 722. Processor(s) 724 may include one or more of any type of processing element, a processor core, microprocessor, microcontroller, field-programmable gate arrays (FPGAs), application-specific integrated circuits (ASICs), digital signal processor, and the like. There can be any number of processors.

Memory 726 is bi-directionally connected to bus 722. Memory 726 can be one or more of any type of volatile or non-volatile memory. Examples of memory types include non-volatile memories such as flash, one-time programmable (OTP), EEPROM (electrically eraseable programmable read only memory), and the like. Volatile memory types include static random-access memory (SRAM) and dynamic random-access memory (DRAM). The memory may be used for storing instructions and/or data.

User interface 728 is bi-directionally connected to bus 722 and may be connected to one or more devices for enabling communication with a user such as an administrator. For example, user interface 728 may be enabled for coupling to a display, a mouse, a keyboard, or other input/output device. User interface 728 may also include a network interface having one or more devices for enabling communication with other hardware devices external to data processing system 720.

Instruction memory 730 may include one or more machine-readable storage media for storing instructions for execution by processor(s) 724. In other embodiments, both memories 726 and 730 may store data upon which processor(s) 724 may operate. Memories 726 and 730 may also store, for example, encryption, decryption, and verification applications. Memories 726 and 730 may be implemented in a secure hardware element and may be tamper resistant.

Co-processor 732 is bi-directionally connected to bus 722. Co-processor 732 may be a special type of a co-processor optimized for running encryption/decryption security software according to the RSA, ECC, or Advanced Encryption Standard (AES) or other type of commonly used encryption algorithms including those utilized in conjunction with HBS cryptosystems. Accordingly, and in accordance with the described embodiments, co-processor 732 may be used to efficiently execute instructions for performing Merkle tree traversal and signature verification as discussed above and illustrated in the algorithm of FIG. 5. The algorithm executed on co-processor 732 may be used to encrypt/decrypt data and instructions in data processing system 720.

Network communication interface 734 is bi-directionally connected to bus 722 and is configured to transmit and receive data via a suitable communications network. In various embodiments, communications interface 734 may include a wired or wireless network adapter configured to communicate over a wired or wireless connection with a local area network. In other embodiments, communications interface 734 may be configured to communicate over a wide area network, such as a cellular network (e.g., LTE, 4G, 5G, etc.). Communications interface 734 is configured to transmit and receive data, such as cryptographic signatures, such as those described herein, to remove computing system that may, in turn, elect to validate and or otherwise utilized the cryptographic signatures. In various embodiments, for example, data processing system 720 may be configured to calculate a message signature for a data packet generated by processor(s) 724 of data processing system 720. In that case, both the signature and the data packet may be transmitted to a remote computer system that may, in turn, use the cryptographic signature to confirm the authenticity of the received data packet.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

An embodiment of the present disclosure relates to a device, including: a computer readable memory; and a processor configured to perform steps including: determining a first sequence of a plurality objects, wherein the plurality of objects include an input to a cryptographic signing function; in a first order determined by the first sequence, for each object in the plurality of objects: calculating an output value yi of a hash function executed on the object, where the value i is equal to an index value of the object, calculating a compressed output value xi of a compression function executed on the output value yi, deleting the output value yi from the computer readable memory, and storing the compressed output value xi into the computer readable memory; determining a second sequence of the plurality objects, wherein the second sequence is not equal to the first sequence; in a second order determined by the second sequence, for each object in the plurality of objects: calculating an output value y'i of the hash function executed on the object, where the value i is equal to the index value of the object, calculating a compressed output value x'i of the compression function executed on the output value y'i, determining that the output value x'i is equal to the output value xi, and transmitting the output value y'i in an output data stream.

An embodiment of the present disclosure relates to a device, including: a computer readable memory; and a processor configured to perform steps including: determining a first sequence of a plurality of objects, wherein the plurality of objects include an input to a cryptographic signing function; in a first order determined by the first sequence, for each object in the plurality of objects: determining a first secret key at a first level of a multi-signature hash-tree, determining a second secret key at a second level of the multi-signature hash-tree, wherein the second level of the multi-signature hash-tree is one greater than the first level of the multi-signature hash-tree, calculating an output value yi of a hash function executed on the first secret key and the second key, where the value i is equal to an index value of the object, calculating a compressed output value xi of a compression function executed on the output value yi, deleting the output value yi from the computer readable memory, and storing the compressed output value xi into the computer readable memory; determining a second sequence of the plurality objects, wherein the second sequence is not equal to the first sequence; in a second order determined by the second sequence, for each object in the plurality of objects: determining a third secret key at the first level of the multi-signature hash-tree, determining a fourth secret key at the second level of the multi-signature hash-tree, calculating an output value y'i of the hash function executed on the third secret key and the fourth secret key, where the value i is equal to the index value of the object, calculating a compressed output value x'i of the compression function executed on the output value y'i, determining that the output value x'i is equal to the output value xi, and transmitting the output value y'i in an output data stream.

An embodiment of the present disclosure relates to a method, including: determining a first sequence of a plurality of objects, wherein the plurality of objects include an input to a cryptographic signing function; in a first order determined by the first sequence, for each object in the plurality of objects: determining a first secret key at a first level of a multi-signature hash-tree, determining a second secret key at a second level of the multi-signature hash-tree, wherein the second level of the multi-signature hash-tree is one greater than the first level of the multi-signature hash-tree, calculating an output value yi of a hash function executed on the first secret key and the second key, where the value i is equal to an index value of the object, calculating a compressed output value xi of a compression function executed on the output value yi, deleting the output value yi from a computer readable memory, and storing the compressed output value xi into the computer readable memory; determining a second sequence of the plurality objects, wherein the second sequence is not equal to the first sequence; in a second order determined by the second sequence, for each object in the plurality of objects: determining a third secret key at the first level of the multi-signature hash-tree, determining a fourth secret key at the second level of the multi-signature hash-tree, calculating an output value y'i of the hash function executed on the third secret key and the fourth secret key, where the value i is equal to the index value of the object, calculating a compressed output value x'i of the compression function executed on the output value y'i, determining that the output value x'i is equal to the output value xi, and transmitting the output value y'i in an output data stream.

Although the examples have been described with reference to automotive radar systems, the systems and methods described herein may be implemented in conjunction with other types of radar systems. Devices or components described as being separate may be integrated in a single physical device. Also, the units and circuits may be suitably combined in one or more semiconductor devices. That is, the devices described herein may be implemented as a single integrated circuit, or as multiple integrated circuits.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device, comprising:
a computer readable memory; and
a processor configured to perform steps including:
   determining a first sequence of a plurality objects, wherein the plurality of objects comprise an input to a cryptographic signing function;
   in a first order determined by the first sequence, for each object in the plurality of objects:
      calculating an output value $y_i$ of a hash function executed on the object, where the value i is equal to an index value of the object,
      calculating a compressed output value $x_i$ of a compression function executed on the output value $y_i$,
      deleting the output value $y_i$ from the computer readable memory, and
      storing the compressed output value $x_i$ into the computer readable memory;
   determining a second sequence of the plurality objects, wherein the second sequence is not equal to the first sequence;
   in a second order determined by the second sequence, for each object in the plurality of objects:
      calculating an output value $y'_i$ of the hash function executed on the object, where the value i is equal to the index value of the object,
      calculating a compressed output value $x'_i$ of the compression function executed on the output value $y'_i$,
      determining that the output value $x'_i$ is equal to the output value $x_i$, and
      transmitting the output value $y'_i$ in an output data stream.

2. The device of claim 1, wherein the processor is configured to, after transmitting the output value $y'_i$, deleting the output value $y'_i$ from the computer readable memory.

3. The device of claim 1, wherein the compression function includes a cyclic redundancy check function.

4. The device of claim 1, wherein a first number of bytes in each output value $y_i$ is at least 2.5 kilobytes.

5. The device of claim 4, wherein a second number of bytes in each compressed output value $x_i$ is equal to or less than 4 bytes.

6. The device of claim 1, wherein the processor is further configured to perform the step of, after transmitting all output values $y'_i$ for all objects in the plurality of objects, transmitting the second sequence of the plurality objects in the output data stream.

7. A device, comprising:
a computer readable memory; and
a processor configured to perform steps including:
   determining a first sequence of a plurality of objects, wherein the plurality of objects comprise an input to a cryptographic signing function;
   in a first order determined by the first sequence, for each object in the plurality of objects:
      determining a first secret key at a first level of a multi-signature hash-tree,
      determining a second secret key at a second level of the multi-signature hash-tree, wherein the second level of the multi-signature hash-tree is one greater than the first level of the multi-signature hash-tree,
      calculating an output value $y_i$ of a hash function executed on the first secret key and the second key, where the value i is equal to an index value of the object,
      calculating a compressed output value $x_i$ of a compression function executed on the output value $y_i$,
      deleting the output value $y_i$ from the computer readable memory, and
      storing the compressed output value $x_i$ into the computer readable memory;
   determining a second sequence of the plurality objects, wherein the second sequence is not equal to the first sequence;
   in a second order determined by the second sequence, for each object in the plurality of objects:
      determining a third secret key at the first level of the multi-signature hash-tree,
      determining a fourth secret key at the second level of the multi-signature hash-tree,
      calculating an output value $y'_i$ of the hash function executed on the third secret key and the fourth secret key, where the value i is equal to the index value of the object,
      calculating a compressed output value $x'_i$ of the compression function executed on the output value $y'_i$,
      determining that the output value $x'_i$ is equal to the output value $x_i$, and
      transmitting the output value $y'_i$ in an output data stream.

8. The device of claim 7, wherein the processor is configured to perform the step of determining the first secret key by performing steps including:
   determining that the first secret key is stored in a key structure $\mathcal{K}$ in the computer readable memory;
   retrieving the first secret key from the key structure $\mathcal{K}$; and
   deleting the first secret key from the key structure $\mathcal{K}$.

9. The device of claim 7, wherein the processor is configured to perform the step of determining the first secret key by performing steps including:
   determining that the first secret key is not stored in a key structure $\mathcal{K}$ in the computer readable memory;
   calculating the first secret key; and
   storing the first secret key in the key structure $\mathcal{K}$ in the computer readable memory.

10. The device of claim 7, wherein the processor is configured to, after transmitting the output value y'$_i$, deleting the output value y'$_i$ from the computer readable memory.

11. The device of claim 1, wherein the compression function includes a cyclic redundancy check function.

12. The device of claim 7, wherein a first number of bytes in each output value y$_i$ is at least 480 bytes.

13. The device of claim 12, wherein a second number of bytes in each compressed output value x$_i$ is less than 64 bytes.

14. The device of claim 7, wherein the processor is further configured to perform the step of, after transmitting all output values y'$_i$ for all objects in the plurality of objects, transmitting the second sequence of the plurality objects in the output data stream.

15. A method, comprising:
    determining a first sequence of a plurality of objects, wherein the plurality of objects comprise an input to a cryptographic signing function;
    in a first order determined by the first sequence, for each object in the plurality of objects:
        determining a first secret key at a first level of a multi-signature hash-tree,
        determining a second secret key at a second level of the multi-signature hash-tree, wherein the second level of the multi-signature hash-tree is one greater than the first level of the multi-signature hash-tree,
        calculating an output value y$_i$ of a hash function executed on the first secret key and the second key, where the value i is equal to an index value of the object,
        calculating a compressed output value x$_i$ of a compression function executed on the output value y$_i$,
        deleting the output value y$_i$ from a computer readable memory, and
        storing the compressed output value x$_i$ into the computer readable memory;
    determining a second sequence of the plurality objects, wherein the second sequence is not equal to the first sequence;
    in a second order determined by the second sequence, for each object in the plurality of objects:
        determining a third secret key at the first level of the multi-signature hash-tree,
        determining a fourth secret key at the second level of the multi-signature hash-tree,
        calculating an output value y'$_i$ of the hash function executed on the third secret key and the fourth secret key, where the value i is equal to the index value of the object,
        calculating a compressed output value x'$_i$ of the compression function executed on the output value y'$_i$,
        determining that the output value x'$_i$ is equal to the output value x$_i$, and
        transmitting the output value y'$_i$ in an output data stream.

16. The method of claim 15, further comprising determining the first secret key by performing steps including:
    determining that the first secret key is stored in a key structure $\mathcal{K}$ in the computer readable memory;
    retrieving the first secret key from the key structure $\mathcal{K}$; and
    deleting the first secret key from the key structure $\mathcal{K}$.

17. The method of claim 15, further comprising determining the first secret key by performing steps including:
    determining that the first secret key is not stored in a key structure $\mathcal{K}$ in the computer readable memory;
    calculating the first secret key; and
    storing the first secret key in the key structure $\mathcal{K}$ in the computer readable memory.

18. The method of claim 15, further comprising, after transmitting the output value y'$_i$, deleting the output value y'$_i$ from the computer readable memory.

19. The method of claim 15, further comprising, after transmitting all output values y'$_i$ for all objects in the plurality of objects, transmitting the second sequence of the plurality objects in the output data stream.

20. The method of claim 15, wherein a first number of bits in each output value y$_i$ is at least 480 bytes and a second number of bits in each compressed output value x$_i$ is less than 64 bytes.

* * * * *